March 4, 1969     W. A. THORNTON, JR     3,431,134

METHOD OF ACTIVATION OF PHOSPHOR

Filed Oct. 20, 1965

WITNESSES:
John L. Chopp
Paul Jentzel

INVENTOR
William A. Thornton, Jr.
BY
W. D. Palmer
ATTORNEY

United States Patent Office 3,431,134
Patented Mar. 4, 1969

3,431,134
METHOD OF ACTIVATION OF PHOSPHOR
William A. Thornton, Jr., Cranford, N.J., assignor to Westinghouse Electric Corporation, Pittsburgh, Pa., a Corporation of Pennsylvania
Filed Oct. 20, 1965, Ser. No. 498,922
U.S. Cl. 117—33.5     12 Claims
Int. Cl. C09k *1/12, 1/06;* B44d *1/14*

ABSTRACT OF THE DISCLOSURE

Method of forming and activating a thin layer of phosphor matrix material. The unactivated phosphor matrix material is deposited on a substrate and covered with a thin continuous spacing film which is permeable to activator constituents. Such covered member is then placed proximate activator constituent-containing material and heated to activate the phosphor. The method is particularly adapted to producing electroluminescent zinc sulphide by using a magnesium fluoride spacing film.

---

Figure 1:
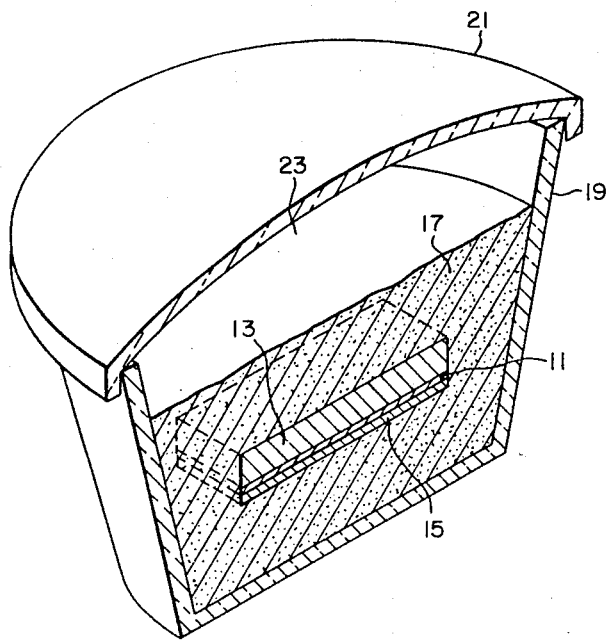

This invention relates generally to the activation of phosphor matrix materials and, more particularly, to a method of activating phosphor layers to be used in luminescent devices.

A previous method of activating luminescent films is disclosed in Thornton U.S. Patent No. 3,044,902. In this method a layer of unactivated phosphor matrix material is deposited as a film or layer onto a suitable substrate. The film and substrate are then embedded in an activated luminescent phosphor powder, allowing the unactivated phosphor matrix layer to contact the powder. While remaining in contact, the matrix layer and powder are heat treated. The activators in the phosphor powder enter and activate the matrix layer. The treated film is brightly electroluminescent when subjected to an electric field. It is desirable, however, to have more intense light output without increasing the electric field. Also, the layers produced by the above method tend to be frosty, which diffuses the light and lowers the light transmission characteristics.

These difficulties are overcome by Harper et al. in a copending application, Ser. No. 413,113, filed Nov. 23, 1964, and assigned to the present assignee. Harper et al. discloses a method of activating phosphor matrix layers which are similar to the above discussed Thornton method, except that the activated phosphor powder is prevented from contacting the unactivated matrix layer during heat treating. An air space between 1 mil and 10 mils in thickness is provided between the matrix layer and surrounding powder. Harper discloses several methods of retaining the space, including metal and fiber spacers. The sensitivity of the matrix layer activated by the Harper method is excellent, especially at low voltages, and the matrix layer surfaces remained optically clear. The explanation for the improvement is not clear. It is definitely established, however, that the thickness of the space was critical and has a great effect on the resulting brightness of luminescence. The resulting brightness is only as uniform as the spacing thickness, thus creating a problem in uniform brightness reproduction. The present invention teaches, among other things, a method for retaining the uniformity of the space thickness, which permits a uniform reproducibility.

It is, therefore, an object of this invention to provide an improved method of forming luminescent layers and particularly electroluminescent layers.

Another object of this invention is to provide a method of forming electroluminescent layers which have improved uniformity of light output and improved reproducibility manufacture.

A further object of this invention is to provide a method of forming an electroluminescent film in which a uniform separation is provided between the unactivated film and the surrounding powder during activation.

Briefly, these and other objects are achieved by forming a layer or thin matrix film of unactivated phosphor material on a suitable substrate, as disclosed in the previously noted Thornton patent. A thin spacing film which is permeable to the phosphor activators is formed over the unactivated matrix film. The substrate and films are then surrounded with electroluminescent phosphor powder. The powder is placed in direct contact with the spacing film, but is prevented from contacting the underlying unactivated matrix film. The substrate, films and powder are then heat treated to activate the film.

Figure 2:
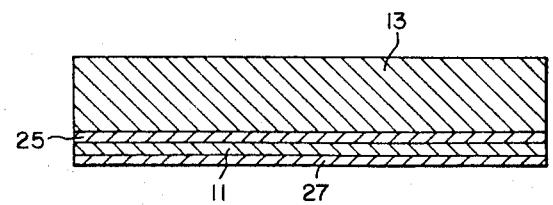

For a better understanding of the invention, reference should be had to the accompanying drawings including:

FIGURE 1 which shows a perspective view, partly in section, of the substrate, films and powder during the heat treatment activation step; and FIG. 2 which shows a cross-sectional view of the activated film included between spaced electrodes.

Referring to FIG. 1, an unactivated phosphor matrix film 11 has been evaporated on a substrate 13. A spacing film 15 of an activator-permeable substance has been uniformly evaporated directly over the film 11. The film 11, the spacing film 15, and substrate 13 are embedded in a finely divided, activated electroluminescent phosphor powder 17. The phosphor powder 17 is contained in a silica crucible 19 with a cover 21. An inert atmosphere such as nitrogen gas is preferably provided in the overhead space 23. The crucible 19 and contents are subjected to a heat treatment during which the temperature is raised to 750° C. for thirty minutes.

The exact mechanism of activation during the heat treating is not clearly understood. Apparently, the activators in the phosphor powder 17 form a vapor during the heat treatment. The vapor passes through the spacing film 15 and is absorbed by the matrix film 11. The uniformity in thickness of the spacing film 15 allows the matrix film 11 to be activated uniformly.

A variety of films 11, spacing films 15, and activated phosphor powder 17 may be used. The preferred combination is a zinc sulphide phosphor matrix film 11, a magnesium fluoride spacing film 15, and zinc sulphide phosphor powder 17. The zinc sulphide is evaporated onto a glass substrate 13 to form the film 11. It is preferable that the glass for this purpose does not sag during the subsequent heat treatment. It is also preferable that the coefficient of thermal expansion of the glass be similar to that of zinc sulphide matrix film. Such glasses are well-known. Other vitreous and inorganic materials may be used, preferably ones that can withstand the 750° C. temperature of the heat treatment.

The initial evaporation process of the film 11 is described in detail in the aforementioned Thornton patent and is outlined briefly as follows. The surface of the substrate 13 is cleaned. The substrate 13 is mounted in a vacuum along with a metallic boat containing the unactivated phosphor material which is to be evaporated onto the substrate 13. The boat and contents are heated, preferably by an electric current which vaporizes the contents. The vapor leaves the boat and condenses on the substrate 13. In order to get a uniform deposit the substrate 13 may be rotated slowly. The bombardment of the substrate 13 by the vaporizing contents of the boat may be prevented by providing a baffle between the boat and substrate 13. The evaporation is continued until the film has a thickness of approximately two microns which can be readily determined by order of interference patterns. This film thickness is given only as an example and may be varied considerably.

The same evaporation technique may be employed to form the spacing film 15 continuously and uniformly over the unactivated matrix film 11. The preferred thickness of the spacing film 15 is about one half-micron. This thickness is not critical and may be varied substantially to suit the materials, heat treatment, and the desired luminescent intensity. Non-uniformities in the spacing film 15 may cause bright and dull spots in the luminescence of the finished film, but the evaporation technique gives excellent uniformity in the thickness of the films. A slight variation in thickness of less than 2% can be expected. As a specific example for forming the magnesium fluoride film 15 on the previously formed zinc sulfide film 11, the sulphide-coated substrate is preferably placed approximately 10 cm. from an evaporation boat, which is preferably formed of tantalum, tungsten or platinum. The substrate and sulphide film are maintained at approximately room temperature and evaporation is accomplished in a bell jar pumped down to a hard vacuum, preferably of from about $10^{-4}$ to about $10^{-6}$ mm. Hg. The evaporation boat is heated to a temperature sufficient to evaporate the magnesium fluoride contents which are deposited onto the zinc sulphide film as a thin continuous layer to a thickness of about one-half micron.

The substrate 13 with the films 11 and 15 is placed in a bed of preferably finely divided activated zinc sulphide electroluminescent phosphor powder 17 contained in the silica crucible 19. The preferred activators are copper and chlorine, but other activators may be employed. More of the phosphor powder 17 is desirably placed over the substrate 13, completely enclosing it. The unactivated film 11 is now ready for the heat treating activation step.

The heat treating or firing consists of raising the temperature of film 11, spacing film 15, and activated phosphor powder 17 to approximately 750° C. for approximately thirty minutes. The mechanism of activation is not understood with certainty. Apparently, spacing film 15 is permeable to the activators, and the activators readily pass therethrough. After heat treating, the film 11 preferably is sodium cyanide washed to remove the MgF₂ spacing film 15 and cuprous sulphide which has deposited on the film 15. Sodium cyanide is a good solvent for cuprous sulphide but not a good solvent for zinc sulphide phosphor film 11.

The temperature used in the firing may be varied considerably, as described in the aforementioned Thornton patent. Also, various films and activating substances therefore may be used as described in the patent to Thornton, and the finely divided material which is placed about and in contact with the formed thin film principally comprises the matrix component of the preselected luminescent material and also includes necessary activator impurity substance in about the same proportions in which such impurity substance is normally added as activator to the raw mix in preparing the preselected luminescent material in finely-divided form. Other known washing materials can be used in place of the preferred sodium cyanide solution wash, as also disclosed in the aforementioned patent to Thornton.

Referring now to FIG. 2, to facilitate applying an electric field which produces the electroluminescence in the now activated film, conductive coatings of films of, for example, tin oxide 25 and aluminum 27 are employed. The tin oxide coating 25 is located between the activated film 11 and the substrate 13 as shown in FIG. 2 and acts as an electrode. The tin oxide or inner electrode 25 between the substrate 13 and the matrix film 11 is formed on the substrate 13 prior to the evaporation of film 11. Electrode 25 is often referred to as the base electrode. After the matrix film 11 has been vacuum deposited, activated, and washed, the outer aluminum electrode 27 is vacuum deposited over the activated matrix film 11. The aluminum or outer electrode 27 is often referred to as the cover electrode and functions as the second electrode. One of the electrodes 25 and 27 must be light transmitting. Normally, the base electrode 25 is made light transmitting because of the ease of formation on the substrate 13. The cover electrode 27 can be relatively thick and opaque, such as a vacuum-metallized aluminum layer. Other conducting materials can be used for these electrodes. Tin oxide is preferred for the light-transmitting electrode 25. It is desirable for the cover electrode 27 to have reflective properties, and for this reason aluminum is frequently used. Other materials may be employed for the cover electrode 27 in place of aluminum.

The resulting electroluminescence of a device produced by the present method is disclosed in the Table I below. The results are compared to the results obtained by other methods. The first device listed in the table was activated in accordance with the method disclosed in Thornton U.S. Patent 3,044,902. The second device was activated similar to the present method except that a SiO layer approximately one-half micron thick was employed instead of the MgF₂ layer. The electroluminescence of the second device was very poor. Apparently, the SiO layer prevented the activators from reaching the phosphor film. The third device was activated in accordance with the present method. Unexpectedly, the MgF₂ spacing film did not prevent the activators from reaching the phosphor film. In addition, the resulting electroluminescence of the third device was even better than the first device which was activated with no spacing film.

TABLE I

| Method of activation | Spacing film | Phosphor film | Light output (in foot Lamberts) | Voltage | Frequency, c.p.s. |
|---|---|---|---|---|---|
| Thornton U.S. Patent No. 3,044,902. | None | ZnS | 8 | 50 | 400 |
| SiO film | SiO ½ micron thick | ZnS | .1 | 130 | 400 |
| Present method | MgF₂ ½ micron thick | ZnS | 24 | 19 | 400 |

The preferred copper activated, zinc sulphide film as disclosed hereinbefore is electroluminescent as well as photoluminescent (U.V. responsive) and cathodoluminescent. The matrix can be modified by incorporating cadmium sulphide into the composition to produce a zinc-cadmium sulphide phosphor, and such phosphors are well known.

Following is a listing of phosphors which can be formed as luminescent films in accordance with the present invention. This listing is by no means complete, but is representative of the possible phosphor films which can be made brightly responsive.

TABLE II

| Phosphor | Cathodo-luminescent color | Photo-luminescent color | Evaporation temperature used in forming matrix film, °C. | Firing temperature of formed film and powder, °C. |
| --- | --- | --- | --- | --- |
| (ZnCd)S:Ag | Blue-green to red depending on Zn-Cd ratio and activator concentration. | Same | 1,300 | 750 |
| (ZnCd)S:Cu | Green to orange depending on Zn-Cd ratio and activator concentration. | do | 1,300 | 750 |
| ZnS:Cu:Mn | Yellow | Yellow | 1,300 | 750 |
| ZnS:Cu | Blue | Green | 1,300 | 750 |
| ZnS:Mn | Yellow | | 1,300 | 750 |
| ZnS:Ag | Blue | Blue | 1,300 | 750 |
| $Zn_3B_2O_3$ | Yellow | Yellow | 1,200 | 800 |
| $3.5MgO \cdot MgF_2 \cdot GeO_2$:Mn | Red | | 1,300 | 900 |
| $Zn_2SiO_4$:Mn | Green | Green | 1,500 | 1,100 |
| $CdSiO_3$ | Red-orange | | 1,500 | 750–1,200 |
| $CdBO_3$ | do | | 850 | 750 |
| ZnO:Zn | Green-blue | | 1,200 | 900 |
| $Zn_3(PO_4)_2$:Mn | Orange | | 1,200 | 750 |
| 4,500° K. halophosphate | Yellow | | 1,200 | 800 |

It will be recognized that the objects of the invention have been achieved by providing an improved method for making a luminescent film, and particularly an electroluminescent film, which is uniformly sensitive and brightly responsive to energization.

We claim as our invention:

1. The method of activating a layer of unactivated phosphor matrix material deposited as a layer on a substrate, in order to produce a high brightness luminescent phosphor layer, said method comprising:
   depositing directly on and contacting said unactivated matrix layer a thin continuous spacing film which is permeable to activators for said unactivated layer;
   embedding the substrate-phosphor matrix layer-spacing film composite in a finely divided powder of said activated phosphor; and
   heating said embedded composite and said powder to a predetermined temperature and for a time sufficient to cause activator material to traverse said permeable spacing film and enter into and activate said unactivated matrix layer.

2. The method as specified in claim 1, wherein said method includes the additional step of washing said permeable spacing film with a material which is a good solvent for said permeable spacing film, but which is not a good solvent for said matrix layer.

3. The method as specified in claim 1, wherein said unactivated phosphor matrix layer principally comprises ZnS.

4. The method as specified in claim 3, wherein said finely divided powder principally comprises finely divided zinc sulphide phosphor.

5. The method as specified in claim 4, wherein said spacing film consists essentially of $MgF_2$.

6. The method as specified in claim 5, wherein said $MgF_2$ spacing film is approximately one-half micron in thickness.

7. The method as specified in claim 5, wherein said ZnS unactivated matrix layer and said $MgF_2$ spacing film are deposited by vacuum deposition.

8. The method of forming an electroluminescent zinc sulphide continuous layer supported on a substrate, said method comprising the steps of:
   (a) forming a film of said ZnS onto a light-transmitting, electrically conducting tin oxide film which is carried on a glass substrate;
   (b) forming a thin spacing film of $MgF_2$ of about one-half micron in thickness over the area of said ZnS layer which is to be activated;
   (c) embedding the film-covered ZnS layer in finely divided, activated electroluminescent zinc sulphide phosphor powder; and
   (d) heat treating from ZnS layer and said powder at a predetermined temperature for a predetermined time to cause said activator to enter said layer and activate same.

9. The method as specified in claim 8, wherein during said heat treating the predetermined temperature is 750° C. and the predetermined time is 30 minutes.

10. The method of activating a layer of unactivated phosphor matrix material deposited as a layer on a substrate, in order to produce a high brightness luminescent phosphor layer, said method comprising:
    depositing directly on and contacting said unactivated matrix layer a thin continuous spacing film which is permeable to activators for said unactivated layer;
    embedding the substrate-phosphor matrix layer-spacing film composite in finely divided material principally comprising the matrix component of said phosphor and also including activator in about the proportions normally used in the raw mix in preparing said phosphor in finely divided form; and
    heating said substrate-phosphor matrix layer-spacing film composite and said finely divided embedding material to a predetermined temperature and for a time sufficient to cause activator from said finely divided embedding material to traverse said permeable spacing film and enter into and activate said unactivated matrix layer.

11. The method of forming an electroluminescent zinc sulphide continuous layer supported on a substrate, said method comprising the steps of:
    (a) forming a film of said zinc sulphide onto a light-transmitting, electrically conducting tin oxide film which is carried on a glass substrate;
    (b) forming a thin spacing film of $MgF_2$ of about one-half micron in thickness over the area of said zinc sulphide layer which is to be activated;
    (c) embedding the covered zinc sulphide layer in finely divided material principally comprising zinc sulphide and also including activator in about the proportion normally used in the raw mix in preparing activated zinc sulphide electroluminescent phosphor in finely divided form; and
    (d) heat treating said covered zinc sulphide layer and said finely divided embedding material at a predetermined temperature for a predetermined time to cause said activator from said embedding material to enter said zinc sulphide layer and activate same.

12. The method as specified in claim 11, wherein said activator is copper and chlorine.

References Cited

UNITED STATES PATENTS 3,044,902   7/1962   Thornton ———————— 117—33.5 X

ALFRED L. LEAVITT, *Primary Examiner.*

R. L. BROWDY, *Assistant Examiner.*

U.S. Cl. X.R.

117—217